(12) United States Patent
Kaplan

(10) Patent No.: US 10,059,470 B1
(45) Date of Patent: Aug. 28, 2018

(54) APPARATUS AND METHODS FOR CREATING ARTIFICIAL GEOSYNCHRONOUS ORBITS

(71) Applicant: Launchspace Technologies Corporation, Wilmington, DE (US)

(72) Inventor: Marshall H. Kaplan, Bethesda, MD (US)

( * ) Notice: Subject to any disclaimer, the term of this patent is extended or adjusted under 35 U.S.C. 154(b) by 0 days.

(21) Appl. No.: 15/912,658

(22) Filed: Mar. 6, 2018

Related U.S. Application Data

(60) Provisional application No. 62/628,345, filed on Feb. 9, 2018.

(51) Int. Cl.
   *B64G 1/24*    (2006.01)
   *B64G 1/52*    (2006.01)
   *B64G 1/40*    (2006.01)

(52) U.S. Cl.
   CPC ............. *B64G 1/242* (2013.01); *B64G 1/405* (2013.01); *B64G 1/52* (2013.01)

(58) Field of Classification Search
   CPC .................................. B64G 1/242; B64G 1/52
   See application file for complete search history.

(56) References Cited

U.S. PATENT DOCUMENTS

| | | |
|---|---|---|
| 3,004,735 A | 10/1961 | Kinard |
| 3,277,724 A | 10/1966 | Lundeberg |
| 3,381,420 A | 5/1968 | Brink et al. |
| 4,306,692 A | 12/1981 | Kaplan et al. |
| 4,381,092 A | 4/1983 | Barker |
| 4,991,799 A | 2/1991 | Petro |
| 5,259,577 A | 11/1993 | Achkar et al. |
| 5,277,385 A | 1/1994 | Flament |
| 5,299,764 A | 4/1994 | Scott |
| 5,372,340 A | 12/1994 | Ihara et al. |
| 5,485,485 A | 1/1996 | Briskman et al. |
| 5,511,748 A | 4/1996 | Scott |
| 5,813,632 A | 9/1998 | Taylor |
| 6,419,191 B1 | 7/2002 | Hoyt et al. |
| 6,439,508 B1 | 8/2002 | Taylor |
| 6,484,973 B1 | 11/2002 | Scott |
| 6,655,637 B1 | 12/2003 | Robinson |
| 6,845,303 B1 | 1/2005 | Byler |

(Continued)

OTHER PUBLICATIONS

Phipps, C., "Catcher's Mitt" as an Alternative to laser Space Debris Mitigation, AIP Conference Proceedings, Oct. 2010.

(Continued)

*Primary Examiner* — Brian M O'Hara
(74) *Attorney, Agent, or Firm* — Wiley Rein LLP

(57) ABSTRACT

An orbiting satellite can be maintained in a geosynchronous orbit (e.g., with an orbital period equal to one sidereal day) at an altitude other than 35,786 km by equipping the satellite with at least one radial thruster. Radial thrusters on the anti-Earth-facing side of the satellite allow for artificial geosynchronous orbits higher than the natural altitude, while radial thrusters on the Earth-facing side of the satellite allow for artificial geosynchronous orbits lower than the natural altitude. This allows a geosynchronous satellite to evade threats, such as orbital debris and/or hostile spacecraft, without losing signal to ground based antennas. Similar techniques can also be used for surveillance of satellites in geosynchronous orbits.

14 Claims, 6 Drawing Sheets

(56) References Cited

U.S. PATENT DOCUMENTS

| | | | |
|---|---|---|---|
| 6,945,500 | B2 | 9/2005 | Wingo |
| 6,962,310 | B1 | 11/2005 | Bigelow |
| 7,575,200 | B2 | 8/2009 | Behrens et al. |
| 7,905,453 | B2 | 3/2011 | Benedict et al. |
| 9,399,527 | B2 * | 7/2016 | Lee .................. B64G 1/242 |
| 9,434,485 | B1 | 9/2016 | Lehocki |
| 9,555,905 | B2 | 1/2017 | Griffith et al. |
| 2004/0026571 | A1 | 2/2004 | Scott |
| 2004/0245407 | A1 | 12/2004 | D'Ausilio et al. |
| 2005/0067534 | A1 | 3/2005 | Anderman et al. |
| 2005/0151022 | A1 | 7/2005 | D'Ausilio et al. |
| 2005/0258311 | A1 | 11/2005 | Scott |
| 2006/0038085 | A1 | 2/2006 | Duden |
| 2006/0090636 | A1 | 5/2006 | Yang et al. |
| 2006/0145024 | A1 | 7/2006 | Kosmas |
| 2008/0149776 | A1 | 6/2008 | Benedict |
| 2008/0296436 | A1 | 12/2008 | D'Ausilio et al. |
| 2009/0164055 | A1 | 6/2009 | Kosmas |
| 2011/0121139 | A1 | 5/2011 | Poulos |
| 2011/0198446 | A1 | 8/2011 | Knirsch et al. |
| 2012/0068018 | A1 | 3/2012 | Wright |
| 2012/0175467 | A1 | 7/2012 | Dye et al. |
| 2012/0286097 | A1 | 11/2012 | Hanada et al. |
| 2013/0062472 | A1 | 3/2013 | Stokes |
| 2013/0175401 | A1 | 7/2013 | Starke et al. |
| 2014/0367523 | A1 | 12/2014 | Kitazawa et al. |
| 2015/0102174 | A1 | 4/2015 | Chu |
| 2015/0259081 | A1 | 9/2015 | Albert et al. |
| 2016/0023783 | A1 | 1/2016 | Griffith, Sr. et al. |
| 2016/0130020 | A1 | 5/2016 | Chambert |
| 2016/0149599 | A1 | 5/2016 | Lindsay et al. |
| 2016/0244190 | A1 | 8/2016 | Okada et al. |
| 2017/0015444 | A1 | 1/2017 | Okada |
| 2017/0029138 | A1 | 2/2017 | Bultel |
| 2017/0247125 | A1 * | 8/2017 | Stratemeier .......... B64G 1/1085 |

OTHER PUBLICATIONS

Woignier, T. et al., Aerogels Materials as Space Debris Collectors, Hindawi Publishing Corporation, 2013.

John E. Prussing et al., Constant Radial Thrust Acceleration Redux—Engineering Notes, Journal of Guidance, Control, and Dynamics, vol. 21, No. 3, May-Jun. 1998.

Frederick W. Boltz, Orbital Motion Under Continuous Radial Thrust—Engineering Notes, American Institute of Aeronautics and Astronautics, Inc., vol. 14, No. 3, May-Jun. 1991.

H.S. Tsien, Take-Off from Satellite Orbit, Journal of the American Rocket Society, Jul.-Aug. 1953, pp. 233-236.

Baffin, R.H., Astronautical Guidance, McGraw-Hill, New York, 1964.

Baffin, R.H., An Introduction to the Mathematics and Methods of Astrodynamics, AIAA, New York, 1987.

\* cited by examiner

APPARATUS AND METHODS FOR CREATING ARTIFICIAL GEOSYNCHRONOUS ORBITS

CROSS-REFERENCE TO RELATED APPLICATIONS

This application claims the benefit of U.S. provisional application No. 62/628,345, filed 9 Feb. 2018, which is hereby incorporated by reference as though fully set forth herein.

BACKGROUND

The instant disclosure relates generally to satellites. In particular, the instant disclosure relates to apparatus and methods for maintaining a satellite in an artificial geosynchronous orbit, such as a geostationary orbit at an altitude other than the natural altitude of 35,786 km.

A "geosynchronous orbit" is an orbit around Earth, the orbital period of which is equal to a sidereal day (i.e., 23 hours, 56 minutes, 4 seconds), irrespective of the inclination of the orbit. A geosynchronous orbit need not be circular. The apparent motion of a satellite in geosynchronous orbit relative to Earth is typically a vertical figure eight. A person at a given point on Earth will observe a satellite in geosynchronous orbit at the same place at the same time of day every day.

A "geostationary orbit" is a specific case of geosynchronous orbit. In particular, a geostationary orbit is a circular, equatorial orbit in which a satellite remains stationary over a single point on the equator.

The geostationary Earth orbit ("GEO") is a singularity, in that there is only one such natural orbit at an altitude of 35,786 km. If a parameter of the orbit, such as altitude or eccentricity, changes, the satellite will no longer remain stationary relative to the Earth's surface. Thus, a satellite in GEO is effectively locked into a given location relative to Earth. This allows the use of fixed ground antennas to continuously receive and send signals between the ground and the geostationary satellite. Direct-to-home broadcast satellites are one example of geostationary satellites.

Although geosynchronous orbits offer certain advantages, they also have shortcomings. For instance, because their altitude, latitude, and longitude are predictable, or even fixed, satellites in geosynchronous orbits are more vulnerable to hostile action (e.g., attack by hostile spacecraft or ground-based threats, such as lasers and anti-satellite missiles). In addition, because satellites in geosynchronous orbits cannot change altitude, latitude, or longitude without risking a loss of contact with fixed ground antennas, they cannot execute large longitude or latitude maneuvers or altitude changes to evade threats, whether those threats are passive (e.g., orbital debris) or deliberate (e.g., hostile action).

BRIEF SUMMARY

Disclosed herein is a method of controlling an orbiting satellite having at least one radial thruster, such as an ion thruster or other electric propulsion device. The radial thruster can be integral to the satellite or, alternatively, integral to a maneuver assistance vehicle that is docked to the satellite.

The method includes commanding the at least one radial thruster to generate thrust sufficient to maintain an orbital period of the satellite equal to a sidereal day with the satellite at an altitude other than 35,786 km. Such an orbit (that is, an orbit with an orbital period equal to a sidereal day at an altitude other than 35,786 km) is referred to herein as an "artificial geosynchronous orbit." An "artificial geostationary orbit" (or "artificial GEO") is a specific case of artificial geosynchronous orbit, where the satellite remains stationary over a single point on the equator.

The at least one radial thruster can be positioned on an anti-Earth-facing side of the satellite, allowing the altitude other than 35,786 km to be an altitude greater than 35,786 km. Alternatively, the at least one radial thruster can be positioned on an Earth-facing side of the satellite, allowing the altitude other than 35,786 km to be an altitude less than 35,786 km. Of course, a satellite can have radial thrusters on both the anti-Earth facing and Earth-facing sides, allowing it to achieve altitudes both greater and less than 35,786 km.

In embodiments of the disclosure, the method also includes detecting a threat to the satellite, such as orbital debris, a hostile spacecraft, or a ground-based (e.g., laser or anti-satellite missile) attack. The satellite can evade the threat by commanding the at least one radial thruster to generate sufficient thrust to move the satellite to the altitude other than 35,786 km. Once the threat has passed and/or been evaded, the at least one radial thruster may be commanded to deactivate, allowing the satellite to return to an altitude of 35,786 km, optionally with maneuver assistance from one or more non-radial thrusters (e.g., a longitudinal control thruster).

The instant teachings can also be applied to surveil a target satellite, and in particular a target satellite in geosynchronous orbit (e.g., a GEO at 35,786 km altitude). For instance, in embodiments of the disclosure, commanding the at least one radial thruster to generate thrust sufficient to maintain an orbital period of the satellite equal to a sidereal day with the satellite at an altitude other than 35,786 km can include commanding the at least one radial thruster to generate thrust sufficient to position the satellite in the altitude other than 35,786 km, such that the satellite can surveil the target satellite from a fixed position relative to the target satellite. The fixed position can be radially in front of or radially behind the target satellite; in particular, if the fixed position is radially behind the target satellite, it will be harder to detect that the target satellite is under surveillance.

The foregoing and other aspects, features, details, utilities, and advantages of the present invention will be apparent from reading the following description and claims, and from reviewing the accompanying drawings.

DETAILED DESCRIPTION

The instant disclosure provides apparatus and methods for the creation of artificial geosynchronous orbits, including artificial geostationary orbits. As used herein, and as discussed above, the term "artificial geosynchronous orbit" means an orbit that has the characteristics of a natural geosynchronous orbit (e.g., an orbital period equal to one sidereal day), except altitude above Earth (e.g., it has an altitude other than 35,786 km). Similarly, an "artificial geostationary orbit" (or "artificial GEO") is an orbit that has the characteristics of a natural geostationary orbit (e.g., a circular, equatorial orbit with an orbital period of one sidereal day where the satellite remains stationary over a single point on the equator), except altitude above Earth (e.g., it has an altitude other than 35,786 km).

For purposes of illustration, aspects of the disclosure will be described herein with reference to the creation of an artificial geostationary orbit. Those of ordinary skill in the art will appreciate, however, that the instant teachings can also be applied to other artificial geosynchronous orbits.

Figure 1:
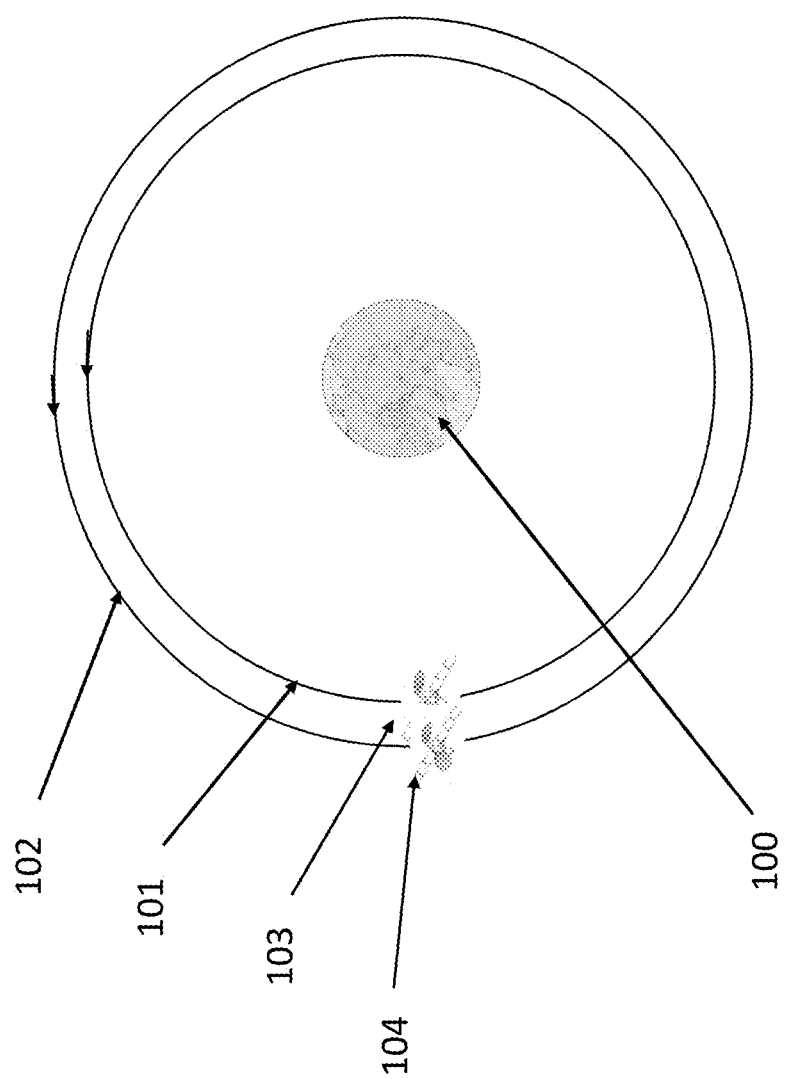
FIG. 1 illustrates natural and artificial geostationary orbits.

FIG. 1 depicts the Earth 100, a natural geostationary Earth orbit ("GEO") 101, an artificial geostationary Earth orbit 102, and two satellites 103 and 104. Satellite 103 is in GEO 101, while satellite 104 is in artificial GEO 102.

As those skilled in the art will appreciate, GEO 101 is, by definition, a circular orbit in the equatorial plane with a constant altitude of 35,786 km and an orbital period equal to one sidereal day. As depicted, artificial GEO 102 is a circular orbit in the equatorial plane with a constant altitude greater than 35,786 km.

Those of skill in the art will appreciate that artificial GEO 102 would typically have a slightly longer orbital period than GEO 101. The use of radial thrusters, however, allows artificial GEO 102 to also have an orbital period of one sidereal day. More specifically, and as described in greater detail below, the use of continuous radial thrust to push satellite 104 towards Earth 100 decreases the orbital period of satellite 104 until it matches that of satellite 103 in GEO 101 (e.g., one sidereal day).

Figure 2:
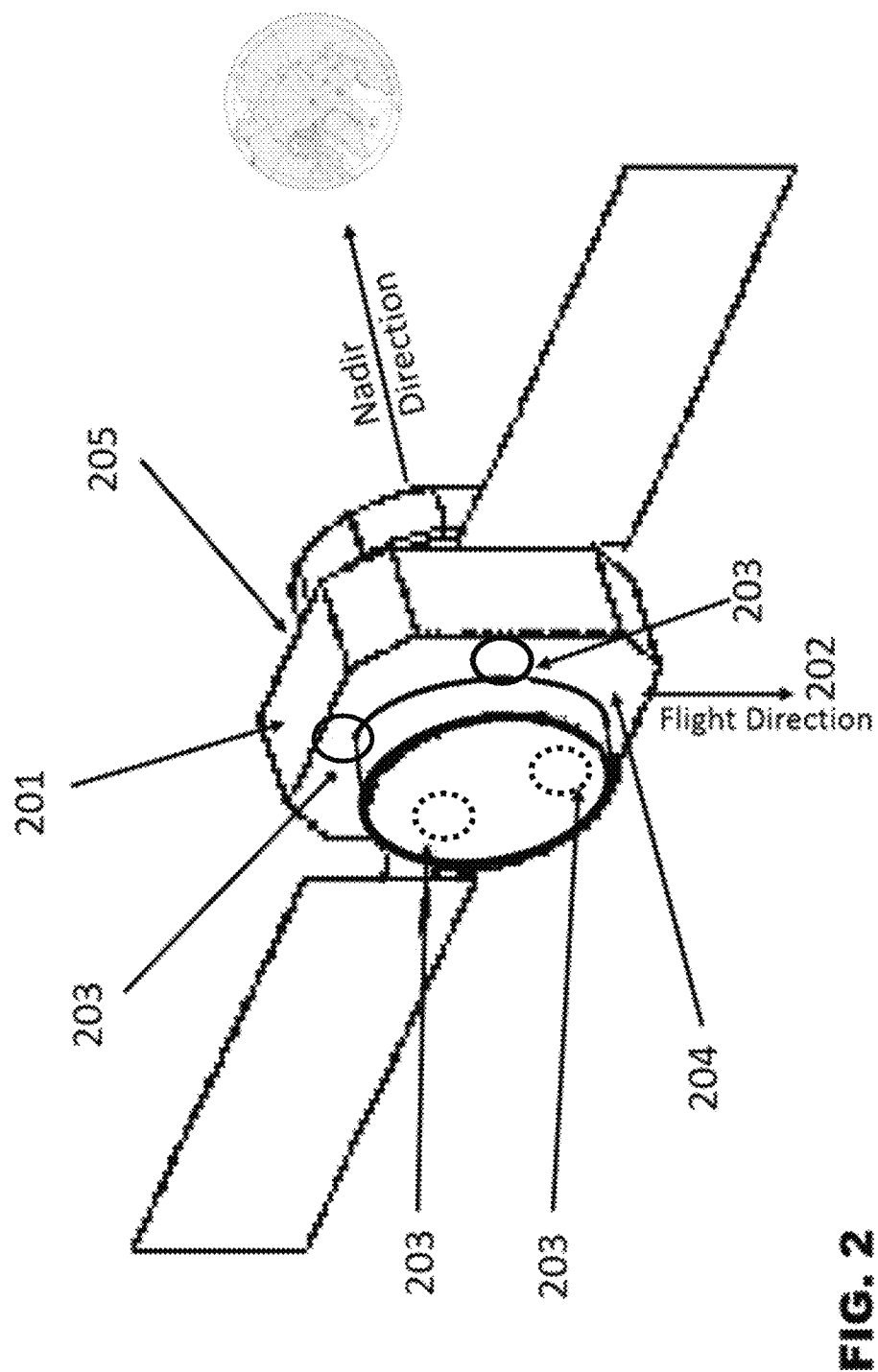
FIG. 2 depicts a satellite equipped with radial thrusters according to aspects of the instant disclosure.

FIG. 2 illustrates a geostationary satellite 201 with its main antennas oriented towards Earth (e.g., in the nadir direction). The orbital path 202 of satellite 201 is shown in the easterly direction. Satellite 201 can include maneuvering thrusters for latitude and longitude control; insofar as maneuvering thrusters are generally understood in the art, they need not be further described herein. Satellite 201 also includes one or more radial thrusters 203 on the anti-Earth-facing side 204 of satellite 201 and/or the Earth-facing side 205 of satellite 201.

Radial thrusters 203 placed on the anti-Earth-facing side 204 of satellite 201 can generate thrust sufficient to allow satellite 201 to maintain an altitude greater than that of GEO 101 while still having an orbital period of one sidereal day (e.g., artificial GEO 102 of FIG. 1). Conversely, radial thrusters 203 placed on the Earth-facing side 205 of satellite 201 can generate thrust sufficient to allow satellite 201 to maintain an altitude less than that of GEO 101 while still having an orbital period of one sidereal day.

In aspects of the disclosure, radial thrusters 203 allow the altitude of satellite 201 to be altered without altering its longitude 104. Thus, satellite 201 can maintain contact with fixed ground antennas, as if it remained in GEO 101, despite moving to or otherwise being positioned in an artificial GEO at a different altitude.

Desirably, radial thrusters 203 are electric propulsion devices, such as ion thrusters, that can fire for long periods of time at low thrust levels.

It is contemplated that radial thrusters 203 could be incorporated into satellite 201 during manufacture thereof. Alternatively, radial thrusters 203 could be incorporated into a secondary spacecraft that attaches to satellite 201. As an example, radial thrusters 203 could be incorporated into a life extension spacecraft that is attached to an orbiting satellite that is nearing the end of its life and/or into a maneuver assistance vehicle that is attached to an orbiting satellite that lacks radial thrusters.

Figure 3:
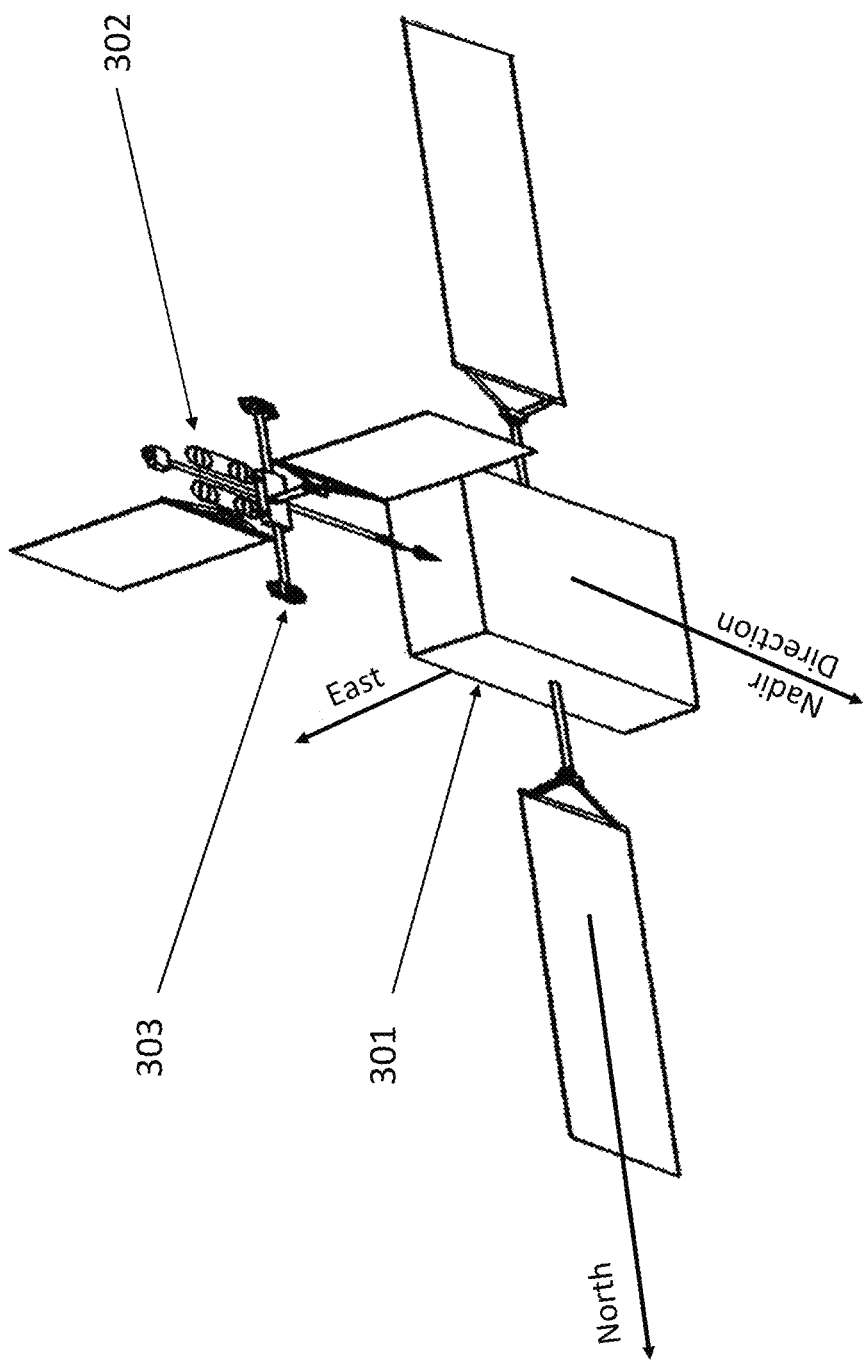
FIG. 3 depicts a maneuver assistance vehicle docked to a satellite.

FIG. 3 depicts an exemplary maneuver assistance vehicle 302 and a satellite 301 lacking radial thrusters. Once maneuver assistance vehicle 302 is docked with satellite 301 (docking will be familiar to those of ordinary skill in the art and need not be described in detail herein), radial thrusters 303 can be deployed.

One example of how to transition a satellite between GEO 101 and artificial GEO 102 will now be described. Assume a satellite traveling in GEO 101 (e.g., at 35,786 km altitude) in an easterly direction. One or more west-facing thrusts (e.g., from maneuver thrusters on the satellite) will speed the satellite up, thus resulting in an increase in altitude and orbital period. As the satellite increases in altitude, radial thrusters on the anti-Earth facing surface of the satellite will activate, producing thrust sufficient to maintain an orbital period of one sidereal day. To transition the satellite back to GEO 101, one or more east-facing thrusts (e.g., from one or more maneuver thrusters on the satellite) can be used to slow the satellite down, allowing it to descend back to GEO 101 (e.g., at 35,786 km altitude).

Figure 4:
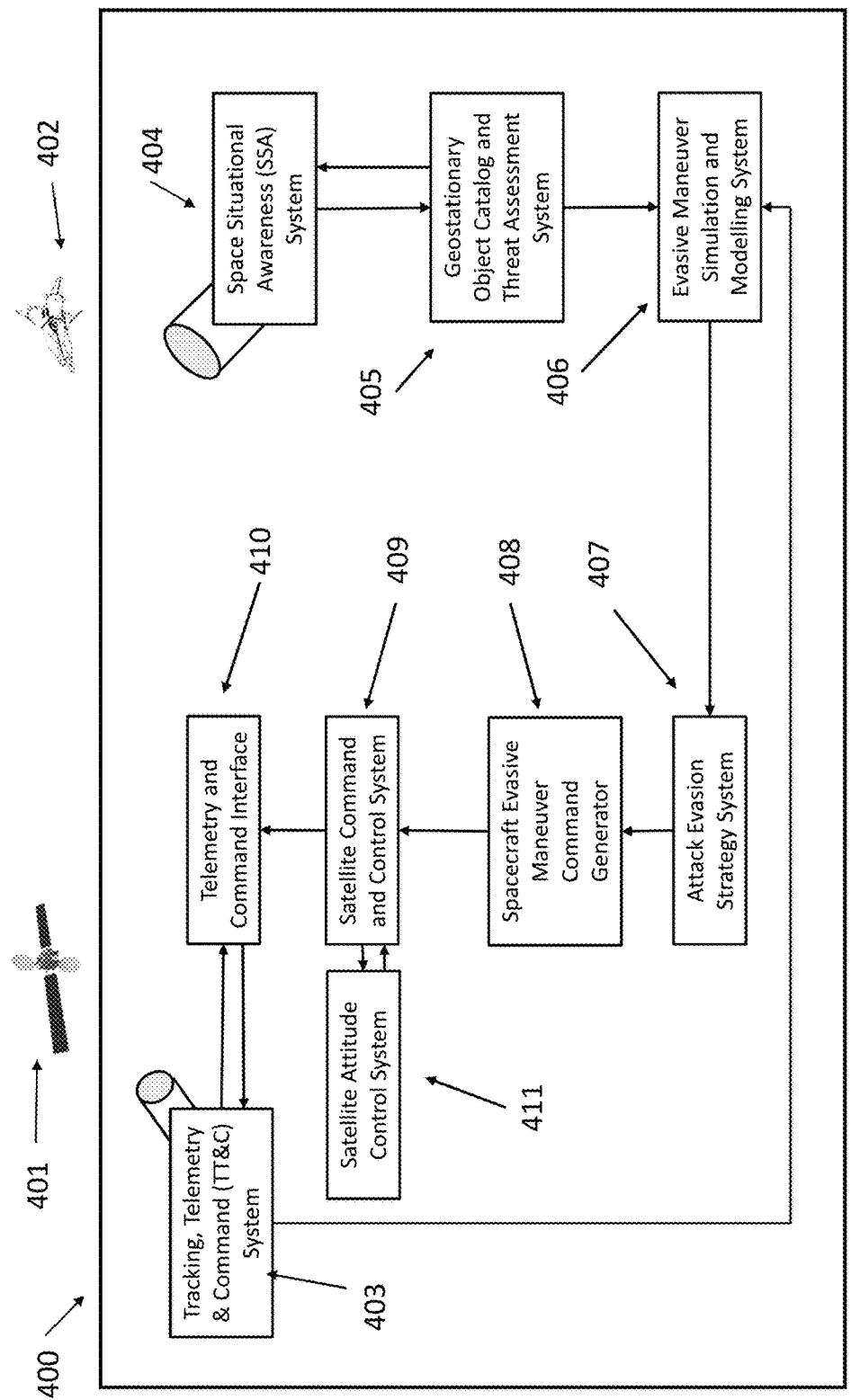
FIG. 4 is a block diagram of an exemplary avoidance control maneuver network according to the teachings herein.

As discussed above, the teachings herein can be applied to good advantage to evade threats to an orbiting satellite, such as debris and hostile action. FIG. 4 illustrates, in block diagram form, an avoidance control maneuver network 400 for planning and executing radial evasive maneuvers that can be executed by a geostationary satellite 401 (e.g., using radial thrusters integrated into satellite 401 or a secondary vehicle, such as a maneuver assistance vehicle, docked to satellite 401). A tracking, telemetry, and command system 403 tracks geostationary satellite 401 as it orbits Earth 100 (e.g., in GEO 101 of FIG. 1).

A threat 402 to satellite 401, such as orbital debris, a hostile spacecraft, a ground-based laser, an anti-satellite missile, or the like is detected by the space situational awareness system 404, a geostationary object catalog 405, and/or another suitable ground- or space-based system. Upon confirmation that threat 402 is approaching satellite 401 or otherwise endangering satellite 401, the evasive maneuver simulation and modeling system 406 can issue a threat alert and generate evasive maneuver options. The options can be sent to the evasion strategy system 407, which can in turn select the most desirable or advantageous evasive maneuver model (e.g., to increase or decrease the altitude of satellite 401 relative to GEO 101) and thereafter send it to the spacecraft maneuver command generator 408. In the event of a hostile threat, maneuver options can include random or timed complex altitude change profiles to elude an aggressor's attack strategies.

Spacecraft maneuver command generator 408 converts the maneuver model into one or more commands for satellite 401 and forwards those commands to satellite command and control system 409 for integration with other commands (e.g., satellite attitude commands). Commands can then be passed to the telemetry and command interface 410 and, ultimately, sent to satellite 401 via tracking, telemetry, and command system 403. Upon receipt at satellite 401 (including, in embodiments of the disclosure, a secondary spacecraft attached thereto), the commands are executed. A similar process can be followed to return satellite 401 to GEO 101 once the threat 402 has abated.

Figure 5:
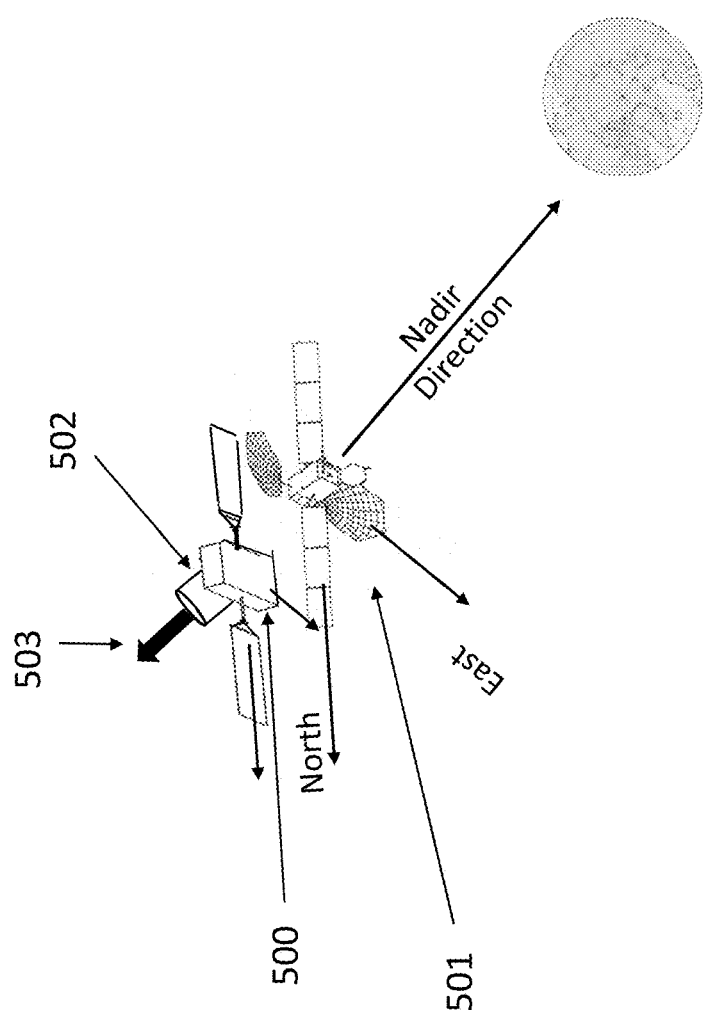
FIG. 5 depicts a surveillance satellite in an artificial geosynchronous orbit surveilling a target satellite in a geosynchronous orbit.

As shown in FIG. 5, the teachings herein can also be applied to allow a surveillance satellite 500 in an artificial geosynchronous orbit to surveil a target satellite 501 in a geosynchronous orbit. In particular, radial thrusters 502 on surveillance satellite 500 produce an exhaust 503 in the anti-nadir direction that allows surveillance satellite 500 to "hide" behind (that is, at a higher altitude than) and in a fixed relationship to target satellite 501 as target satellite 501 orbits the Earth. Because surveillance satellite 500 is behind target satellite 501 (in a "stakeout" position), it will be difficult to detect the ongoing surveillance.

Figure 6:
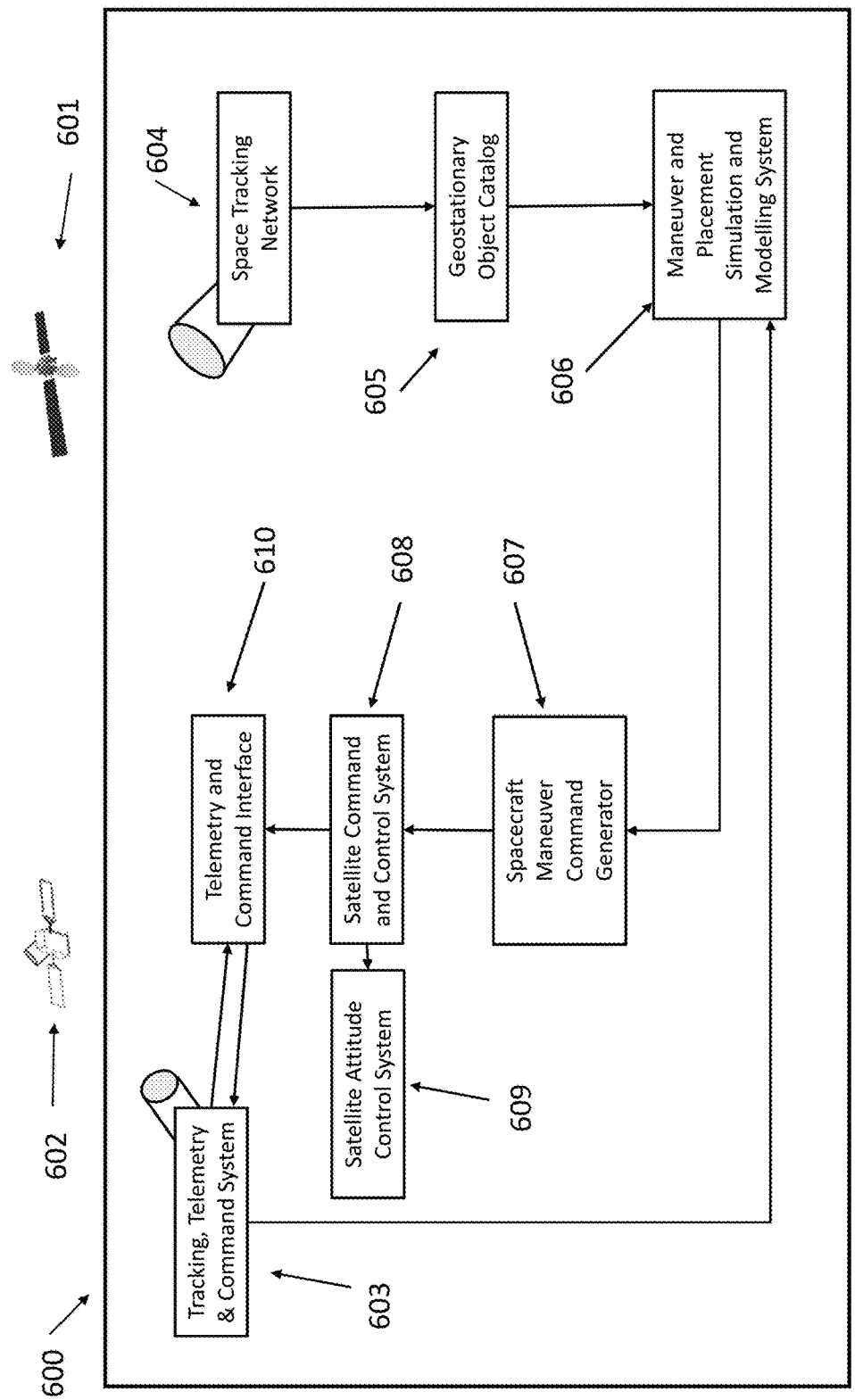
FIG. 6 is a block diagram of an exemplary surveillance maneuver network according to the teachings herein.

FIG. 6 illustrates, in block diagram form, a surveillance maneuver network 600 for achieving and maintaining a surveillance satellite 602 in a stakeout position relative to a target satellite 601 in a geosynchronous orbit. Space tracking network 604 detects the position of target satellite 601 and can verify its identity using an object catalog 605. The maneuver and placement simulation and modeling system 606 can then generate the maneuvers to place surveillance satellite 602 in the stakeout position. In turn, commands for the actual maneuver sequence can be generated by maneuver command generator 607. The sequence can then be forwarded to a satellite command and control system 608, which can integrate the maneuver commands with additional commands (e.g., from satellite attitude control system 609). The integrated command set can then be passed to a telemetry and command interface 610, which transmits the commands to surveillance satellite 602 through a tracking, telemetry, and command system 603 for execution.

Although several embodiments have been described above with a certain degree of particularity, those skilled in the art could make numerous alterations to the disclosed embodiments without departing from the spirit or scope of this invention.

All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method of controlling a satellite, the satellite comprising at least one radial thruster, the at least one radial thruster being positioned on one or more of a nadir-facing side of the satellite and an anti-nadir-facing side of the satellite, the method comprising:
   orbiting the satellite in a natural geostationary Earth orbit; and
   commanding the at least one radial thruster to generate thrust sufficient to alter an altitude of the satellite and maintain the satellite in a circular artificial geosynchronous orbit having an orbital period equal to a sidereal day.

2. The method according to claim 1, wherein the at least one radial thruster is positioned on the anti-nadir-facing side of the satellite, and wherein the altered altitude of the satellite is greater than an altitude of the natural geostationary Earth orbit.

3. The method according to claim 1, wherein the at least one radial thruster is positioned on the nadir-facing side of the satellite, and wherein the altered altitude of the satellite is less than an altitude of the natural geostationary Earth orbit.

4. The method according to claim 1, further comprising:
   detecting a threat to the satellite; and
   wherein commanding the at least one radial thruster to generate thrust sufficient to alter an altitude of the satellite and maintain the satellite in a circular artificial geosynchronous orbit having an orbital period equal to a sidereal day comprises evading the threat to the satellite by commanding the at least one radial thruster to generate sufficient thrust to move the satellite to the circular artificial geosynchronous orbit.

5. The method according to claim 4, further comprising commanding the at least one radial thruster to generate sufficient thrust to return the satellite to the natural geostationary Earth orbit after evading the threat to the satellite.

6. The method according to claim 4, wherein the threat to the satellite comprises orbital debris.

7. The method according to claim 4, wherein the threat to the satellite comprises a hostile spacecraft.

8. The method according to claim 4, wherein the threat to the satellite comprises a ground-based attack upon the satellite.

9. The method according to claim 1, wherein the at least one radial thruster comprises at least one electric propulsion device.

10. The method according to claim 9, wherein the at least one electric propulsion device comprises at least one ion thruster.

11. The method according to claim 1, further comprising:
   identifying a target satellite to surveil, wherein the target satellite is in a geosynchronous orbit; and
   wherein commanding the at least one radial thruster to generate thrust sufficient to alter an altitude of the satellite and maintain the satellite in a circular artificial geosynchronous orbit having an orbital period equal to a sidereal day comprises commanding the at least one radial thruster to generate sufficient thrust to position the satellite in the circular artificial geosynchronous orbit, such that the satellite can surveil the target satellite from a fixed position relative to the target satellite.

12. The method according to claim 11, wherein the geosynchronous orbit of the target satellite is at an altitude of 35,786 km.

13. The method according to claim 11, wherein the fixed position relative to the target satellite is either radially behind the target satellite or radially in front of the target satellite.

14. The method according to claim 1, further comprising docking a maneuver assistance vehicle to the satellite, wherein the at least one radial thruster is attached to the maneuver assistance vehicle.

* * * * *